Patented Nov. 15, 1938

2,137,119

UNITED STATES PATENT OFFICE 2,137,119

PLASTIC COMPOSITION

Earl C. Sherrard, Edward Beglinger, and John P. Hohf, Madison, Wis., and Ernest Bateman, deceased, late of Madison, Wis., by William T. Bateman, Madison, Wis., special administrator, assignors to Henry A. Wallace, Secretary of Agriculture of the United States of America No Drawing. Application January 28, 1938, Serial No. 187,568

3 Claims. (Cl. 260—9)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without the payment to us of any royalty thereon.

Our invention relates to a method of treatment whereby sawdust can be rendered plastic and to the product resulting from practicing such method.

An object of our invention is a method of treatment of sawdust, wood waste, straw, bagasse, and similar pentosan-containing vegetable fibrous materials for the production of a product suitable for molding purposes.

Another object is the production of a substance resulting from the treatment of pentosan-containing vegetable fibrous materials that when subjected to heat and pressure yields a substance that is high in strength, moisture-, water-, fire-resistance, and that answers as an excellent dielectric.

Hereafter, for the purpose of clarity, the term "sawdust" shall be taken to include wood waste, straw, bagasse, and similar pentosan-containing vegetable fibrous material.

We find that when sawdust is heated with chlorine gas an exothermic reaction takes place in the mixture which is very similar to destructive distillation of wood, but at a much lower temperature (75° to 105° C.) than is required for destructive distillation without chlorine (about 150° C.). This reaction is accompanied by the formation of pyroligneous acid and a tarlike substance containing furfural. If heating of the mixture is continued until the completion of the reaction, most, if not all of the furfural formed by the reaction will be polymerized to such an extent that it is no longer a thermoplastic.

We further find that if, at the beginning of the aforementioned exothermic reaction, aniline, or other aromatic amine, be added to the mixture, a polymer of the furfural and amine is formed which is thermoplastic and which is insoluble in water, permitting the mixture to be thoroughly washed with water to remove the pyroligneous acid and other water-soluble reaction products which would be detrimental to the finished molding product.

Our invention, therefore, concerns primarily the controlled reaction of sawdust and chlorine gas, the reaction being carried to the point of the formation of the desired reaction product, furfural, when this reaction is checked by the introduction of aniline, or other aromatic amine, for the formation of a water-insoluble, thermoplastic furfural resin, after which the undesirable reaction products, pyroligneous acid, etc., are washed from the mixture.

Our invention will be better understood from the following typical example, which is merely given by way of illustrating our invention:

*Example 1.*—To 100 parts of sawdust about 3 parts of chlorine are added, mixed, and the mixture heated to about 100° C., or until the first few drops of pyroligneous acid have distilled from the container. At this point about 10 parts of aniline, or other aromatic amine are added with thorough mixing. The mixture is allowed to stand until cool, and is then washed with hot water until acid free, and then dried. The chlorinated product is then ready for molding, with or without the addition of further plasticizers or solvents. A very satisfactory press is made with 100 parts of the chlorinated product and 10 parts benzol pressed at about 3000 pounds per square inch, at a temperature of about 150° C., for, say, 15 minutes.

Having thus described our invention, what we claim for Letters Patent is:

1. A method for producing a material possessing the essential properties of plastic flow under heat and pressure, which comprises treating substantially 100 parts of air-dry vegetable fibrous material with substantially 3 to 10 parts of chlorine, thence heating the mixture to the point at which the exothermic destructive distillation reaction begins, thence adding substantially 10 parts of aniline to the mixture, thence copiously washing, and thence drying to a known uniform moisture content.

2. A method for producing a material possessing the essential properties of plastic flow under heat and pressure, which comprises adding chlorine to vegetable fibrous material, thence heating to the point of destructive distillation, thence adding an aromatic amine, thence copiously washing, and thence drying to a known uniform moisture content.

3. The product derived from the process defined by claim 2.

EARL C. SHERRARD.
EDWARD BEGLINGER.
JOHN P. HOHF.
WILLIAM T. BATEMAN,
Special Administrator of Ernest Bateman, Deceased.